US005898732A

United States Patent [19]
Dapper et al.

[11] Patent Number: 5,898,732
[45] Date of Patent: Apr. 27, 1999

[54] DATA SERVICE CHANNEL PROVISION FOR AN AM COMPATIBLE BROADCAST SYSTEM

[75] Inventors: Mark J. Dapper, Cincinnati; Barry W. Carlin, Greenhills; Michael J. Geile, Loveland, all of Ohio

[73] Assignee: USA Digital Radio Partners, L.P., New York, N.Y.

[21] Appl. No.: 08/602,553

[22] Filed: Feb. 20, 1996

[51] Int. Cl.[6] ............................................... H04L 27/02
[52] U.S. Cl. ........................... 375/268; 375/300; 375/320
[58] Field of Search ........................... 375/216, 260–261, 375/268, 280, 281, 298, 300, 308, 316, 320, 324, 329, 332; 370/493, 494, 495, 527, 528, 529; 455/45

[56] References Cited

U.S. PATENT DOCUMENTS

| | | | |
|---|---|---|---|
| 3,160,812 | 12/1964 | Scantlin | 375/269 |
| 3,714,375 | 1/1973 | Stover | 375/269 |
| 4,323,731 | 4/1982 | Hershberger | 381/16 |
| 4,379,947 | 4/1983 | Warner | 370/204 |
| 4,512,013 | 4/1985 | Nash et al. | 370/215 |
| 4,550,415 | 10/1985 | Debus, Jr. et al. | 375/234 |
| 4,843,583 | 6/1989 | White et al. | 364/724.19 |
| 4,847,797 | 7/1989 | Picchi et al. | 364/602 |
| 5,006,926 | 4/1991 | Tsinberg | 348/437 |
| 5,113,142 | 5/1992 | Yoshikawa | 329/306 |
| 5,146,612 | 9/1992 | Grosjean et al. | 455/45 |
| 5,175,747 | 12/1992 | Murakami | 375/232 |
| 5,191,576 | 3/1993 | Pommier et al. | 370/312 |
| 5,214,671 | 5/1993 | Nakai | 375/232 |
| 5,243,624 | 9/1993 | Paik et al. | 375/232 |
| 5,268,930 | 12/1993 | Sendyk et al. | 375/231 |
| 5,351,148 | 9/1994 | Maeda et al. | 359/124 |
| 5,448,590 | 9/1995 | Kostic | 375/232 |
| 5,588,022 | 12/1996 | Dapper et al. | 375/216 |

*Primary Examiner*—Young T. Tse
*Attorney, Agent, or Firm*—R. P. Lenart

[57] ABSTRACT

A service channel is provided for concurrent communication with an amplitude modulated compatible digital broadcast signal. A transmitter receives input program information and input data service and combines the program information and data service to produce composite data. The transmitter generates an over-the-air signal waveform using the composite data. This signal is an amplitude modulated compatible digital broadcast signal. At least one receiver is used in the system to detect the over-the-air signal waveform produced by the transmitter. The receiver parses the composite data into program information and data service. The parsing of this composite data is achieved by using header information provided on each of the input program information and input data service.

10 Claims, 3 Drawing Sheets

DATA SERVICE CHANNEL PROVISION FOR AN AM COMPATIBLE BROADCAST SYSTEM

BACKGROUND OF THE INVENTION

1. Field Of The Invention

This invention relates to radio broadcasting and, more particularly, to methods of and apparatus for providing a service channel for an amplitude modulated compatible digital broadcast signal.

2. Description Of Related Art

There has been increasing interest in the possibility of broadcasting digitally encoded audio signals to provide improved audio fidelity. Several approaches have been suggested. One such approach, set forth in copending patent application Ser. No. 08/206,368, filed Mar. 7, 1994, now U.S. Pat. No. 5,588,022 assigned to the assignee hereof, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal. Both transmitters and receivers are provided in accordance with that method.

The waveform in the AM compatible digital audio broadcasting system described in U.S. Pat. No. 5,588,022, hereby incorporated herein by reference, has been formulated to provide optimal data throughput for the digital signal while avoiding cross talk into the analog AM channel. Multiple carriers are employed by means of orthogonal frequency division multiplexing (OFDM) to bear the communicated information. If additional information besides broadcaster program material is programmed concurrently with the program material, data services can be used over the commercial broadcasting channel to communicate any type of information that has been coded in a binary format.

There has been extensive work performed in the past to provide systems for transmitting data simultaneously with audio. For example, U.S. Pat. No. 4,379,947 discloses an FM broadcasting system for transmitting a data signal simultaneously with an auxiliary audio program on the same subcarriers of the FM transmission channel. The main program is transmitted on the FM transmission channel carrier and the auxiliary audio program, which may be background music, is transmitted on the subcarriers in a conventional manner. The data signal, which is added to the auxiliary audio program, is a binary digital information signal. A receiver adapted for use with this broadcasting system is capable of receiving one or more of the main program, the auxiliary radio program, and the data signal.

U.S. Pat. No. 4,512,013 discloses a technique for transmitting an entire analog speech signal and a modulated data signal over a transmission channel such as a common analog telephone speech channel. U.S. Pat. No. 5,146,612 discloses a technique for using a subcarrier frequency of a radio station to transmit, receive, and display a message together with audio reproduction of the radio program.

U.S. Pat. No. 5,191,576 discloses a method for broadcasting digital data for use by mobile receivers traveling in an urban environment in the presence of stray signals and jamming.

U.S. Pat. No. 3,160,812 discloses a composite transmission system utilizing phase shift and amplitude modulation.

U.S. Pat. No. 3,714,375 discloses a secondary phase modulated communication service using AM broadcast stations.

The recently discovered ability to broadcast digitally encoded audio signals in a standard AM broadcasting channel has made possible the ability to provide data service in addition to broadcaster program material using AM digital audio broadcasting systems. Accordingly, there is a need for a system which provides a data service channel concurrent with a commercial broadcasting channel.

SUMMARY OF THE INVENTION

The present invention provides a service channel which communicates concurrently with an amplitude modulated compatible digital broadcast signal. The system includes a transmitter having means for inputting program information, means for inputting data service, means for combining the program information and the data service to produce composite data, and means for generating an over-the-air signal waveform using the composite data. At least one receiver is provided to detect the over-the-air signal waveform produced by the transmitter and parse the composite data into program material and data service. Preferably, the receiver is also provided with means to format the output of the data service as required by an external interface.

BRIEF DESCRIPTION OF THE DRAWINGS

The invention will be more readily apparent to those skilled in the art by reference to the accompanying drawing wherein.

DETAILED DESCRIPTION OF THE PREFERRED EMBODIMENTS

This invention provides a method of simultaneously broadcasting both an analog amplitude modulated signal and a digital signal on the same channel assignment as the existing analog AM broadcasting allocation. When this technique is applied to AM radio broadcasts, the broadcasting can be done in the same frequency band and at the same carrier frequencies that are currently allocated for AM broadcasting. The technique of broadcasting the digital signal in the same channel as an analog AM signal is called in-band on-channel (IBOC) broadcasting. The need to prevent mutual interference places restrictions on the digital waveform that is placed beneath the analog AM spectrum. This broadcasting is accomplished by transmitting a digital waveform by way of a plurality of carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. There are various methods for producing orthogonally related signals. The specific method employed to ensure this orthogonality condition is not a part of this invention. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
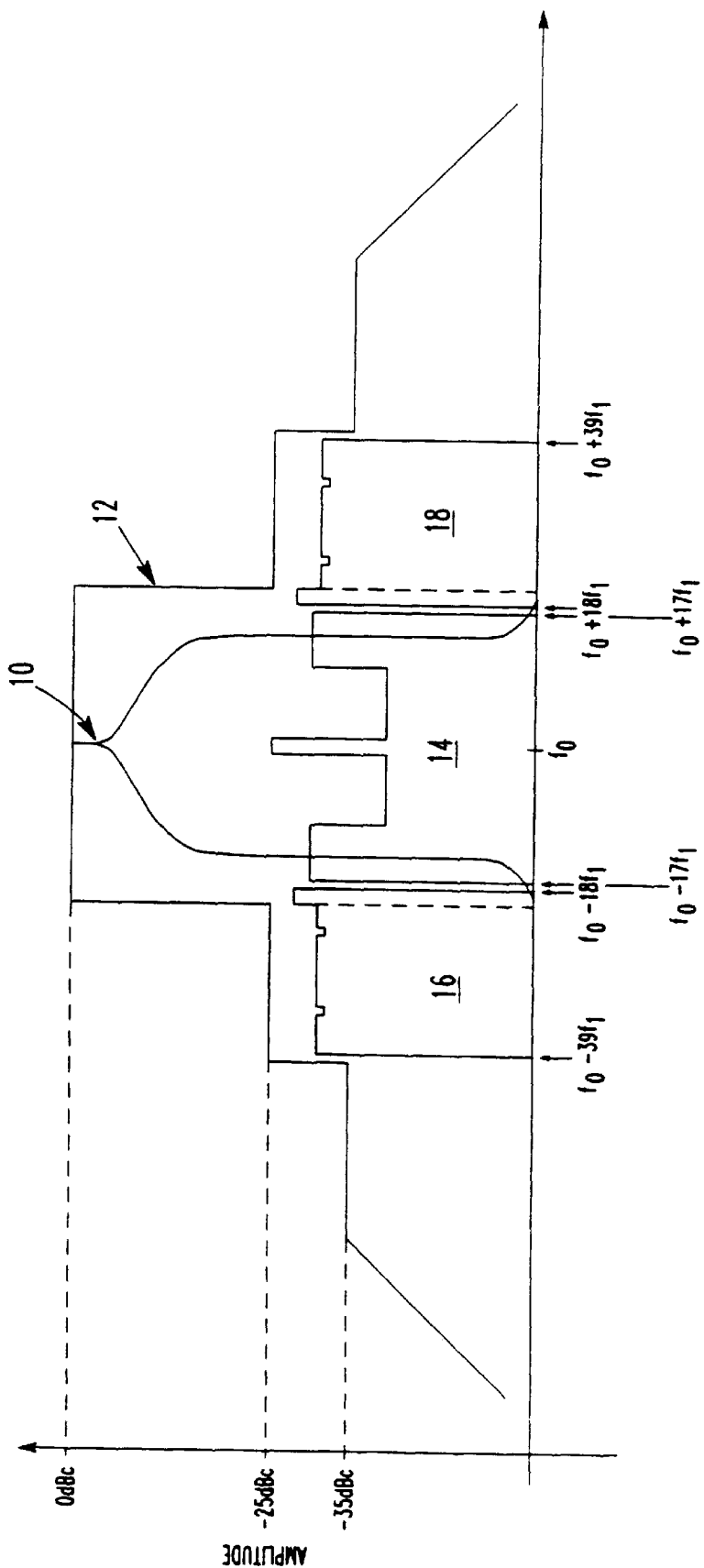
FIG. 1 is a spectral representation of a composite analog AM and digital broadcasting signal having carriers positioned in accordance with the present invention.

FIG. 1 shows the spectrum of an AM digital audio broadcasting signal having carriers positioned in accordance with the present invention. Curve 10 represents the standard broadcasting amplitude modulated carrier signal, wherein the carrier has a frequency of f0. The FCC emissions mask is represented by item number 12. Recent advances in source coding, such as the German Institut Fur Multiplexing) algorithm, have shown that enhanced audio quality for stereo program material can be achieved by broadcasting digital signals at rates as low as 96 kilobits per second (kbps). Waveforms which support this data rate can be inserted within the FCC emissions mask presently allocated for AM stations by employing bandwidth efficient modulation techniques.

The digitally modulated carriers in this invention are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter. The OFDM modulation technique is extremely beneficial for successful DAB operation since bandwidth is a premium commodity in the AM band. An additional advantage is that there is no need to isolate the DAB digital carriers from each other via filtering in either the transmitter or receiver since the orthogonality condition of OFDM minimizes such interference.

The OFDM waveform is composed of a series of data carriers spaced at 500 Hz. This produces enhanced spectral containment and enables the AM DAB waveform to extend extremely close to the edge of the FCC emissions mask, yet remain compliant. An additional feature of this approach is that the amplitude of each carrier can be tailored to boost signal power in areas where high interference levels are anticipated, such as locations close to the carrier frequencies of interferers. This strategy produces an optimal allocation of signal energy and thereby maximizes the potential AM DAB coverage region.

In this invention, the composite analog and digital DAB waveform includes a plurality of modulated carriers which are fully compliant with the FCC emissions mask. In the preferred embodiment of this invention, 76 carriers, spaced f1=500 Hz apart, are used to carry the digital information. A first group of thirty four of the digitally modulated carriers are positioned within a frequency band extending from (f0−17 f1) to (f0+17 f1), as illustrated by the envelope labeled 14 in FIG. 1. Most of these signals are placed 30 to 40 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) more fully described and claimed in copending application Ser. No. 08/368,061 filed Jan. 3, 1995. Complementary BPSK modulation is employed on the innermost digital carrier pair at f0+/−f1 to facilitate timing recovery via a Costas loop. These carriers are set at a level of −25 dBc. Eighteen carriers in this first group located at f0−10 f1 to f0×2 f1 and f0+2 f1 to f0+10 f1 are modulated using complementary QPSK and have a level of −39.7 dBc. The final fourteen carriers in the first group are located at f0−17 f1 to f0−11 f1 and f0+11 f1 to f0+17 f1. These carriers are modulated using complementary 32 QAM and have a level of −30 dBC.

Additional groups of quadrature amplitude modulated digital signals are placed outside the first group. The need for these digital waveforms to be in-quadrature with the analog signal is eliminated by restricting the analog AM signal bandwidth. This is not anticipated to be an unreasonable requirement since the ceramic IF filters typically found in analog AM receivers limit the audio response to 3.5 kHz. All of the carriers in a second and a third group, encompassed by envelopes 16 and 18 respectively, are modulated using 32 QAM. The carriers located at f0−19 f1, f0−18 f1, f0+18 f1, and f0+19 f1 have a level of 28 dBC. The carriers at f0−39 f1 to f0−34 f1, f0−32 f1 to f0−23 f1, f0−21 f1, f0+21 f1, f0+23 f1 to f0+32 f1, and f0+34 f1 to f0+39 f1 have a level of −31 dBc. The remaining carriers at f0−33 f1 and f0−22 f1 and f0+22 f1 and f0+33 f1 have a level of −32 dBc.

The OFDM carriers are spaced at f1=500 Hz. However, because a time-domain guard band is used, the symbol rate for each carrier is f[r]=128*200 500/132 symbols per second. The pair of complementary BPSK carriers has 1 bit per symbol, resulting in a bit rate of 18 f[r]. The nine pairs of complementary QPSK carriers each contain 2 bits per symbol, resulting in a total of 18 f[r] bits per second. The seven pairs of complementary 32 QAM carriers each have 5 bits per symbol, resulting in 35 f[r] bits per second. The 42 individual 32 QAM carriers each carry 5 bits per symbol, resulting in 210 f[r] bits per second. The total data rate for all OFDM carriers is 264 f[r], or 128 k bits per second.

The occupied bandwidth of the entire composite AM DAB signal is 40 kHz, a measured to the outermost first nulls of the digital waveform. This spectrum falls within the central 40 kHz portion of the FCC emissions mask. The OFDM sidelobes that extend beyond frequencies outside f0+/−20 kHz, fall below the −35 dBc portion of the emissions mask without any additional filtering since the OFDM sidelobe spacing is only f1=500 Hz.

There are vacant OFDM slots at +/−20 f1 and +/−40 f1. This provides additional immunity to first and second adjacent channel interference since the predominant AM signal component occurs at the carrier frequency. Likewise, the AM DAB spectrum is virtually unoccupied outside of f0+/−20 kHz to ensure a degree of protection against second adjacent channel interferers.

Figure 2:
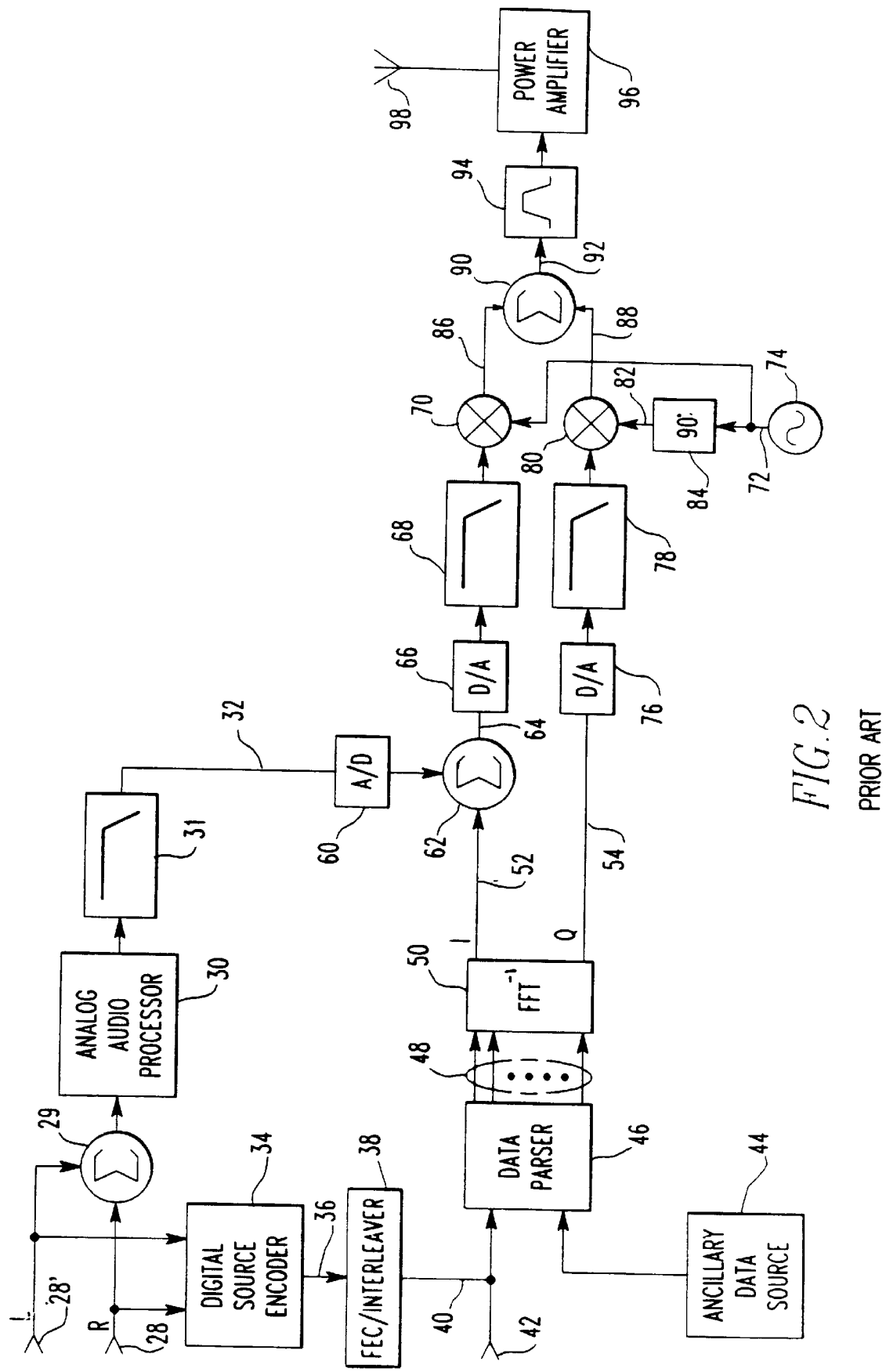
FIG. 2 is a block diagram of a transmitter constructed in accordance with this invention.

FIG. 2 is a block diagram of a transmitter constructed in accordance with this invention. An analog program signal (which in this example includes right and left stereo portions) that is to be transmitted is impressed onto input terminals 28 and 28'. The left and right channels are combined in summation point 29 and then fed through an analog audio processor 30 to increase the average analog AM modulation from 30% to 85%, which extends the coverage region considerably. Such processors are commonplace at analog AM radio stations throughout the world. That signal is passed through a low pass filter 31 having a sharp cutoff characteristic, to produce a filtered monaural analog program signal on line 32. Filter 31 may, for example, have a cutoff frequency of 6 kHz and 40 dB attenuation beyond pb 6.5 kHz.

For those applications in which the analog and digital portions of transmitted signal will be used to convey the same program material, a digital source encoder 34, which may conform to the ISO MPEG Layer 2A, converts the right and left analog program signals to a 96 kbps joint stereo digital signal on line 36. A forward error correction encoder and interleaver circuit 38 improves data integrity over channels corrupted with impulsive noise and interference, producing a 128 kbps digital signal on line 40. For those instances where the digital signal to be transmitted is not a digital version of the analog program signal a data port 42 is provided to receive the digital signal. An ancillary data source 44 is also provided for those instances in which the digital version of the analog program signal, or a digital signal supplied to port 42, is to be supplemented by including additional data.

Data parser 46 receives the digital data and produces a plurality of outputs on lines 48. The signals on pairs of lines 48 from the data parser 46 constitute complex coefficients that are in turn applied to an inverse Fast Fourier Transform (FFT) algorithm in block 50, which generates the baseband in-phase, I, and quadrature, Q, components of the data signal, on lines 52 and 54 respectively. The processed baseband analog AM signal is converted to a digital signal by analog-to-digital converter 60 and combined with the in-phase portion of the digital DAB waveform at summation point 62 to produce a composite signal on line 64. The composite signal on line 64 is converted to an analog signal by digital-to-analog converter 66, filtered by low pass filter 68, and passed to a mixer 70 where it is combined with a radio frequency signal produced on line 72 by a local oscillator 74. The quadrature signal on line 54 is converted to an analog signal by analog-to-digital converter 76 and filtered by low pass filter 78 to produce a filtered signal which is combined in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by bandpass filter 94, and the resulting DAB signal is subsequently amplified by a power amplifier 96 for delivery to a transmitting antenna 98.

Figure 3:
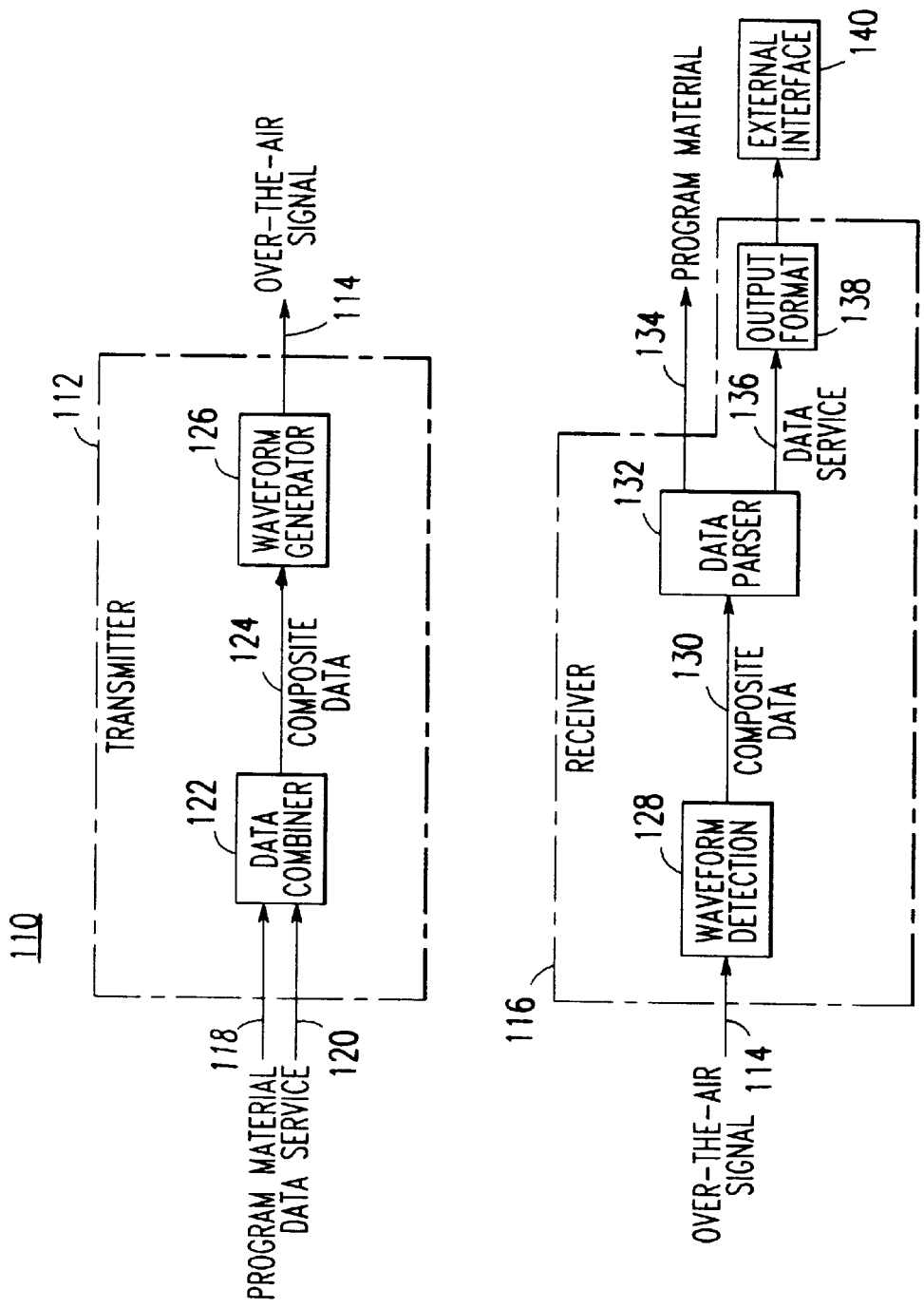
FIG. 3 is a block diagram of the presently preferred service channel provision for an AM compatible digital broadcast system.

As shown in FIG. 3, broadcast system 110 includes a transmitter 112 which sends an over-the-air signal 114 which is detected by receiver 116. Program material 118 and data service 120 are multiplexed in data combiner 122 to produce composite data 124. Header information is added to the composite data stream 124 to differentiate between different data resources such as program material, data services, and the like. The composite data stream 124 is processed by waveform generator 126 into a modulated waveform for over-the-air signal 114.

At the receiver 116, the over-the-air signal 114 is detected by waveform detector 128 and converted into composite data stream 130. Data parser 132 separates the composite data stream 130 into program material 134 and data service 136. Data parser 132 relies on the header information added to the composite data stream 124 in the transmitter 112. The data service information 136 is produced and formatted by output formatter 138 as required by an external device or process 140.

In the foregoing specification certain preferred practices and embodiments of this invention have been set out, however, it will be understood that the invention may be otherwise embodied within the scope of the following claims.

What is claimed is:

1. A system for providing a service channel to be communicated concurrently with an amplitude modulated compatible digital broadcast signal comprising:

(a) a transmitter having;
        i) means for amplitude modulating a first carrier signal by an analog signal to generate a first radio frequency signal having a frequency spectrum;
        ii) means for inputting program information;
        iii) means for inputting data service;
        iv) means for combining said program information and said data service to produce composite data; and
        v) means for generating an over-the-air amplitude modulated compatible digital broadcast signal waveform using said composite data, wherein the over-the-air signal waveform includes a plurality of digitally modulated carrier signals within a frequency range which encompasses the frequency spectrum of the first radio frequency signal, said digitally modulated carrier signals being digitally modulated by the composite data, wherein a first group of said digitally modulated carrier signals overlap the frequency spectrum of the first radio frequency signal and are modulated in-quadrature with said first carrier signal, and wherein second and third groups of said digitally modulated carrier signals lie outside of the frequency spectrum of said first signal and are modulated both in-phase and in-quadrature with said first carrier signal; and (b) at least one receiver having:
        i) means for detecting said over-the-air signal waveform produced by said transmitter; and
        ii) means for parsing said composite data into program material and data service.

2. The system of claim 1 further comprising means provided in said receiver for formatting the output of said data service as required by an external interface.

3. The system of claim 1 wherein header information is provided to each of said program information and said data service in said transmitter, said header information enabling said means for parsing to separate said composite data into program material and data service.

4. A method for providing a service channel to be communicated concurrently with an amplitude modulated compatible digital broadcast signal in a system having a transmitter and at least one receiver comprising the steps of:

(a) amplitude modulating a first carrier signal by an analog signal to generate a first radio frequency signal having a first frequency spectrum;
    (b) inputting program information;
    (c) inputting data service;
    (d) combining said program information and said data service to produce composite data;
    (e) generating an amplitude modulated compatible digital broadcast over-the-air signal waveform using said composite data, wherein the over-the-air signal waveform includes a plurality of digitally modulated carrier signals within a frequency range which encompasses the frequency spectrum of the first radio frequency signal, said digitally modulated carrier signals being digitally modulated by the composite data, wherein a first group of said digitally modulated carrier signals overlap the frequency spectrum of the first radio frequency signal and are modulated in-quadrature with said first carrier signal, and wherein second and third groups of said digitally modulated carrier signals lie outside of the frequency spectrum of said first signal and are modulated both in-phase and in-quadrature with said first carrier signal;

(f) detecting said over-the-air signal waveform in said at least one receiver; and (g) parsing said composite data into program material and data service.

5. The method of claim 4 further comprising the step of formatting the output of said data service as required by an external interface.

6. The method of claim 4 further comprising the intermediate step of providing header information to each of said program information and data service before an over-the-air signal is generated.

7. The method of claim 6 wherein said header information is used to parse said composite data into program information and data service.

8. A transmitter for use in a system for providing a service channel to be communicated concurrently with an amplitude modulated compatible digital broadcast signal comprising:

(a) means for amplitude modulating a first carrier signal by an analog signal to generate a first radio frequency signal having a frequency spectrum;

(b) means for inputting program information;

(c) means for inputting data service;

(d) means for combining said program information and said data service to produce composite data;

(e) means for generating an amplitude modulated compatible digital broadcast over-the-air signal waveform using said composite data, wherein the over-the-air signal waveform includes a plurality of digitally modulated carrier signals within a frequency range which encompasses the frequency spectrum of the first radio frequency signal, said digitally modulated carrier signals being digitally modulated by the composite data, wherein a first group of said digitally modulated carrier signals overlap the frequency spectrum of the first radio frequency signal and are modulated in-quadrature with said first carrier signal, and wherein second and third groups of said digitally modulated carrier signals lie outside of the frequency spectrum of said first signal and are modulated both in-phase and in-quadrature with said first carrier signal.

9. A receiver for use in a system for providing a service channel to be communicated concurrently with an amplitude modulated compatible digital broadcast signal having a transmitter which transmits an over-the-air waveform modulated by program material and data signals, wherein the over-the-air waveform includes a plurality of digitally modulated carrier signals within a frequency range which encompasses the frequency spectrum of the first radio frequency signal, said digitally modulated carrier signals being digitally modulated by the composite data, wherein a first group of said digitally modulated carrier signals overlap the frequency spectrum of the first radio frequency signal and are modulated in-quadrature with said first carrier signal, and wherein second and third groups of said digitally modulated carrier signals lie outside of the frequency spectrum of said first signal and are modulated both in-phase and in-quadrature with said first carrier signal comprising;

(a) means for detecting said over-the-air signal waveform produced by said transmitter; and (b) means for parsing said composite data into program material and data service.

10. The receiver of claim 9 further comprising means for formatting the output of said data service as required by an external interface.

* * * * *